US012698844B2

(12) United States Patent
Dehrmann

(10) Patent No.: US 12,698,844 B2
(45) Date of Patent: Aug. 4, 2026

(54) VALVE CONTROL DEVICE FOR A MOTOR VEHICLE COOLANT CIRCUIT

(71) Applicant: ECO Holding 1 GmbH, Marktheidenfeld (DE)

(72) Inventor: Sven Dehrmann, Worth (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 18/843,954

(22) PCT Filed: Dec. 19, 2022

(86) PCT No.: PCT/EP2022/086535
§ 371 (c)(1),
(2) Date: Sep. 4, 2024

(87) PCT Pub. No.: WO2023/169711
PCT Pub. Date: Sep. 14, 2023

(65) Prior Publication Data
US 2025/0189057 A1     Jun. 12, 2025

(30) Foreign Application Priority Data
Mar. 7, 2022     (DE) ..................... 10 2022 105 293.1

(51) Int. Cl.
*F16K 31/53*     (2006.01)
*F01P 7/14*     (2006.01)
*F16K 31/04*     (2006.01)

(52) U.S. Cl.
CPC .............. *F16K 31/535* (2013.01); *F01P 7/14* (2013.01); *F16K 31/043* (2013.01); *F01P 2007/146* (2013.01)

(58) Field of Classification Search
CPC ............................ F16K 31/535; F16K 31/043
See application file for complete search history.

(56) References Cited

U.S. PATENT DOCUMENTS 12,169,026 B2 * 12/2024 Dehrmann .......... F16K 11/0876
2016/0131095 A1     5/2016 Martin et al.
(Continued)

FOREIGN PATENT DOCUMENTS

AU          544330 B2     5/1985
DE          1298805 B     9/1969
(Continued)

OTHER PUBLICATIONS

German Search Report for Application No. 10 2022 105 293.1 dated Feb. 3, 2023, 2 pages. [See p. 2, categorizing the cited references].
(Continued)

*Primary Examiner* — Michael R Reid
(74) *Attorney, Agent, or Firm* — Lerner David LLP

(57)          ABSTRACT
A valve control device for a coolant circuit of a motor vehicle has a first valve with an associated first functional element, a second valve with an associated second functional element, wherein the first valve and the second valve are adapted to be variable in their switching position by rotation of the respectively associated functional element, and a locking mechanism including a driving device, wherein the locking mechanism is adapted to be rotatable by a drive. The locking mechanism is adapted to be transferred from a first switching position to a second switching position by engagement of the driving device with the first functional element and from a first switching position to a second switching position by engagement of the driving device with the second functional element.

13 Claims, 4 Drawing Sheets

(56) References Cited

U.S. PATENT DOCUMENTS

| | | | |
|---|---|---|---|
| 2020/0003363 A1 | 1/2020 | Köppel et al. | |
| 2022/0120353 A1 | 4/2022 | Dehrmann | |

FOREIGN PATENT DOCUMENTS

| | | | |
|---|---|---|---|
| DE | 102019130952 A1 | 5/2021 | |
| DE | 102021116913 A1 | 4/2022 | |
| EP | 3587893 A1 | 1/2020 | |
| WO | 2014167264 A1 | 10/2014 | |

OTHER PUBLICATIONS

International Search Report for Application No. PCT/EP2022/086535 mailed Apr. 4, 2023, pp. 1-4.

* cited by examiner

100

102

110

102

102

102

102

VALVE CONTROL DEVICE FOR A MOTOR VEHICLE COOLANT CIRCUIT

The present application is a national phase entry under 35 U.S.C. 371 of International Application No. PCT/EP2022/086535, filed Dec. 19, 2022, published in German, the disclosure of which is incorporated herein by reference in its entirety, and which claims priority to German Application No. 10 2022 105 293.1, filed Mar. 7, 2022.

TECHNICAL FIELD

The invention relates to a valve control device for a coolant circuit of a motor vehicle, having a first valve, having an associated first functional element, a second valve, having an associated second functional element, wherein the first valve and the second valve are adapted to be variable in their switching position by rotation of the respectively associated functional element.

PRIOR ART

Numerous devices for handling fluids in electrically driven vehicles are known in the prior art. Fluid devices of this type are used, for example, to switch or divert cooling fluids within so-called thermal management modules of electrically driven vehicles. For example, stepper motors are used to transfer valves from a first switching position to a second switching position.

The fluid devices usually consist of numerous components and are of extremely complex design and therefore very cost-intensive. In addition, there is the problem that an increasing number of actuators has to be used with increasing complexity, which additionally increases the costs. Alternatively, relatively strong actuators have to be used in order to be able to move a plurality of rotary slides and associated seals at the same time.

In this case, checking the current switching position of the valve is frequently also problematic. This is of great relevance, for example, after a power failure. A further disadvantage results from the fact that valves can change by parameters such as temperature, fluid pressure or other influences during the operation of a motor vehicle. In order to prevent this, actuators usually have a holding current which can hold the valves in their switching position. On the one hand, this has effects on the force and therefore on the dimensioning of the actuator. On the other hand, a continuous power consumption of the entire device is necessary.

SUMMARY OF THE INVENTION

The object of the invention is to create a valve control device belonging to the technical field mentioned at the outset, which at least partially overcomes the disadvantages from the prior art. In particular, it is the object of the present invention to provide an improved concept for a valve control device, which reduces the complexity and the costs.

According to an embodiment of the invention, the valve control device for a coolant circuit of a motor vehicle has a first valve having an associated first functional element, and a second valve having an associated second functional element, wherein the first valve and the second valve are adapted to be variable in their switching position by rotation of the respectively associated functional element. In addition, the valve control device comprises a locking mechanism having a driving device, wherein the locking mechanism is adapted to be rotatable by means of a drive, and wherein the locking mechanism is adapted to be transferred from a first switching position to a second switching position by means of engagement of the driving device with the first functional element and from a first switching position to a second switching position by means of engagement of the driving device with the second functional element.

As a result, for example, the technical advantage is achieved that both valves can be actuated with only one locking mechanism. Consequently, only one actuator is still necessary for actuating both valves. For example, the driving device comprises only one driving means, as a result of which the valves can be switched one after the other but not at the same time. This in turn reduces the force requirements on the actuator which drives the locking mechanism. Since the force requirements influence the dimensioning of the actuator, the actuator and therefore the entire device can be realized more compact, lighter and in a more space-saving manner. In addition, a cost reduction results since lower force requirements are associated with lower production costs.

Preferably, each functional element is designed corresponding to the number of switching positions of the associated valve. This results in the advantage that both symmetrical and asymmetrical switching logics can be realized in combination with an arbitrary number of switching positions and connections of the valve control device, which can be operated with only one actuator.

According to a preferred embodiment, the driving device comprises a first spur gear cutout to engage with the first functional element or with the second functional element. As a result, for example, the technical advantage is achieved that an optimal torque transmission can take place between the locking mechanism and the respective functional element. For example, each functional element has a corresponding spur gear which can interact with the spur gear cutout of the driving device. In this case, the torque transmission takes place by means of a continuous movement, because the angular speed between the locking mechanism and the functional elements is constant. This has effects on the drive, because the maximum power consumption is lower in the case of a constant angular speed.

A spur gear cutout in the sense of this invention is to be understood as a spur gear which only exists in a specific angular interval. For example, the spur gear cutout comprises only an angle of 45°, 60° or 90°.

According to a further preferred embodiment, the driving device comprises a second spur gear cutout to engage with the first functional element or with the second functional element. As a result, for example, the technical advantage is achieved that an optimal torque transmission can take place between the locking mechanism and a second functional element. For example, the second functional element also has a corresponding spur gear which can interact with the second spur gear cutout of the driving device. For example, the second spur gear cutout is configured differently than the first spur gear cutout. For example, the angular interval of the first spur gear cutout deviates from the angular interval of the second spur gear cutout, as a result of which different functional elements can be actuated. Thus, for example, a valve with four switching positions can be actuated via the first spur gear cutout and a valve with five switching positions can be actuated via the second spur gear cutout. This is therefore possible with only one locking mechanism and therefore with only one drive.

According to a particularly preferred embodiment, the first spur gear cutout and the second spur gear cutout are arranged spaced apart from each other in an axial direction of the locking mechanism. As a result, for example, the technical advantage is achieved that a first valve can be actuated via an associated first functional element and a second valve can be actuated via an associated second functional element by means of the locking mechanism. For example, the first functional element and the second functional element are likewise arranged spaced apart from each other in the axial direction. For example, the first spur gear cutout and the second spur gear cutout could be arranged offset from each other in a circumferential direction of the locking mechanism.

According to a particularly preferred embodiment, the first functional element and the second functional element each comprise a spur gear for engagement of the first spur gear cutout or the second spur gear cutout. As a result, for example, the technical advantage is achieved that an optimal torque transmission can take place between the locking mechanism and the two functional elements. The torque transmission takes place by means of a continuous movement, because the angular speed between the locking mechanism and the functional elements is constant. This has effects on the drive, because the maximum power consumption is lower in the case of a constant angular speed.

According to a further preferred embodiment, the locking mechanism comprises a first locking contour for abutment against a locking surface of the first functional element and/or against a locking surface of the second functional element.

A locking contour in the sense of the invention is to be understood as a surface which can slide along a corresponding locking surface of a functional element, as a result of which the valve associated with the functional element cannot perform any rotation. When the driving device of the locking mechanism engages with the first functional element and transfers the latter from a first switching position to a second switching position, the second functional element is fixed in its switching position by the locking contour. In this case, the locking contour of the locking mechanism slides along a locking surface of the second functional element. As a result, the technical advantage is achieved that the switching position of the second valve is secured without holding current or other means. The device therefore has a secure self-locking action. Without the use of sensors, the switching position of the valves of the valve control device can be unambiguously ensured at any time.

The correspondence of the locking contour of the locking mechanism with the locking surface of each functional element can be realized, for example, in that both the locking contour and the locking surfaces are formed at least partially as lateral surfaces of a cylinder.

According to a further particularly preferred embodiment, the locking mechanism comprises a second locking contour for abutment against a locking surface of the first functional element and/or against a locking surface of the second functional element. As a result, for example, the technical advantage is achieved that the second locking contour can slide along a corresponding locking surface of a second functional element, as a result of which the second valve associated with the functional element can likewise perform no rotation. Thus, in addition to a first functional element, which can be locked by means of a first locking contour, a second functional element can be fixed in its switching position at the same time or offset from the second locking contour. The second locking contour of the locking mechanism is also adapted to slide along a locking surface of the second functional element, as a result of which the holding position of a second valve is secured without holding current or other means. The device therefore has a secure self-locking action for at least two valves. Without the use of sensors, the switching position of the valves of the valve control device can be unambiguously determined at any time. For example, it is also conceivable to provide further locking contours for further functional elements and the associated valves thereof.

According to an advantageous embodiment, the first locking contour and the second locking contour are arranged spaced apart from each other in an axial direction of the locking mechanism. As a result, for example, the technical advantage is achieved that a first valve can be fixed in its switching position via an associated first functional element and a second valve can be fixed in its switching position via an associated second functional element by means of the first locking contour and the second locking contour of the locking mechanism. For example, the first functional element and the second functional element are likewise arranged spaced apart from each other in the axial direction. For example, the locking surfaces of the first and the second functional element can also be arranged offset from each other in a circumferential direction.

In order to increase the number of switching positions and the flexibility also for additional fluid connections, the valve control device comprises a third valve with an associated third functional element, wherein the third valve is adapted to be variable in its switching position by rotation of the third functional element, and wherein the locking mechanism is adapted to transfer the third valve from a first switching position to a second switching position by means of engagement of the driving device with the third functional element. As a result, for example, the technical advantage is achieved that a total of three valves can be actuated with only one locking mechanism. Consequently, only one actuator is still necessary for actuating the three valves. If the driving device comprises only one spur gear cutout, the valves can be switched one after the other but never at the same time. This in turn reduces the force requirements on the actuator which drives the locking mechanism. Since the force requirements influence the dimensioning of the actuator, the actuator and therefore the entire device can be realized more compact, lighter and in a more space-saving manner, even though three valves are associated with the valve control device. For example, the valve control device comprises more than three valves. For example, the valve control device comprises four, five, six or even more valves. If the driving device comprises a first spur gear cutout and a second spur gear cutout, two valves can be switched at the same time. For example, a plurality of valves can also be switched at the same time.

According to a further advantageous embodiment, the first spur gear cutout is adapted to engage with the second functional element and with the third functional element. As a result, for example, the technical advantage is achieved that at least two functional elements can be switched with only one spur gear cutout. Thus, two valves can be actuated with only one locking mechanism and thus with only one actuator, wherein the valves are switched one after the other. This reduces the force requirements on the actuator which drives the locking mechanism. Lower force requirements ultimately reduce the price of the actuator. The entire device can be realized more compact, lighter and space-saving According to an additionally advantageous embodiment, the first locking contour is adapted to abut against the locking surface of the second functional element and against a locking surface of the third functional element. As a result, for example, the technical advantage is achieved that the first locking surface, depending on the position of the locking mechanism, both the first valve can be fixed in its switching position via the associated first functional element and the second valve can be fixed in its switching position via the associated second functional element by means of the first locking contour.

According to a particularly expedient embodiment, the second spur gear cutout is adapted to engage with the first functional element, and the second locking contour is adapted to abut against the locking surface of the first functional element. DAs a result, for example, the technical advantage is achieved that the first valve can be transferred from a first switching position to a second switching position via the first functional element, wherein the second locking contour is adapted to block the first valve in its position.

According to an advantageous embodiment, the first functional element comprises an odd number of switching positions and the second functional element comprises an even number of switching positions. Therefore, an arbitrary number of switching positions and of fluid connections to be switched can be achieved in the valve control device, which can be operated with only one actuator.

Preferably, the third functional element comprises an even number of switching positions.

According to a further particularly expedient embodiment, the first valve, the second valve and the third valve each comprise at least one rotary slide valve. As a result, for example, there is the technical advantage that rotary slide valves represent existing standard solutions and are therefore inexpensive and easily available. Preferably, the rotary slide valves are designed as ball valves.

Further advantageous embodiments and combinations of features of the invention result from the following detailed description and the totality of the claims.

BRIEF DESCRIPTION OF THE DRAWINGS

The drawings used to explain the exemplary embodiment show.

In principle, identical parts are provided with identical reference symbols in the figures.

WAYS OF CARRYING OUT THE INVENTION

Figure 1:
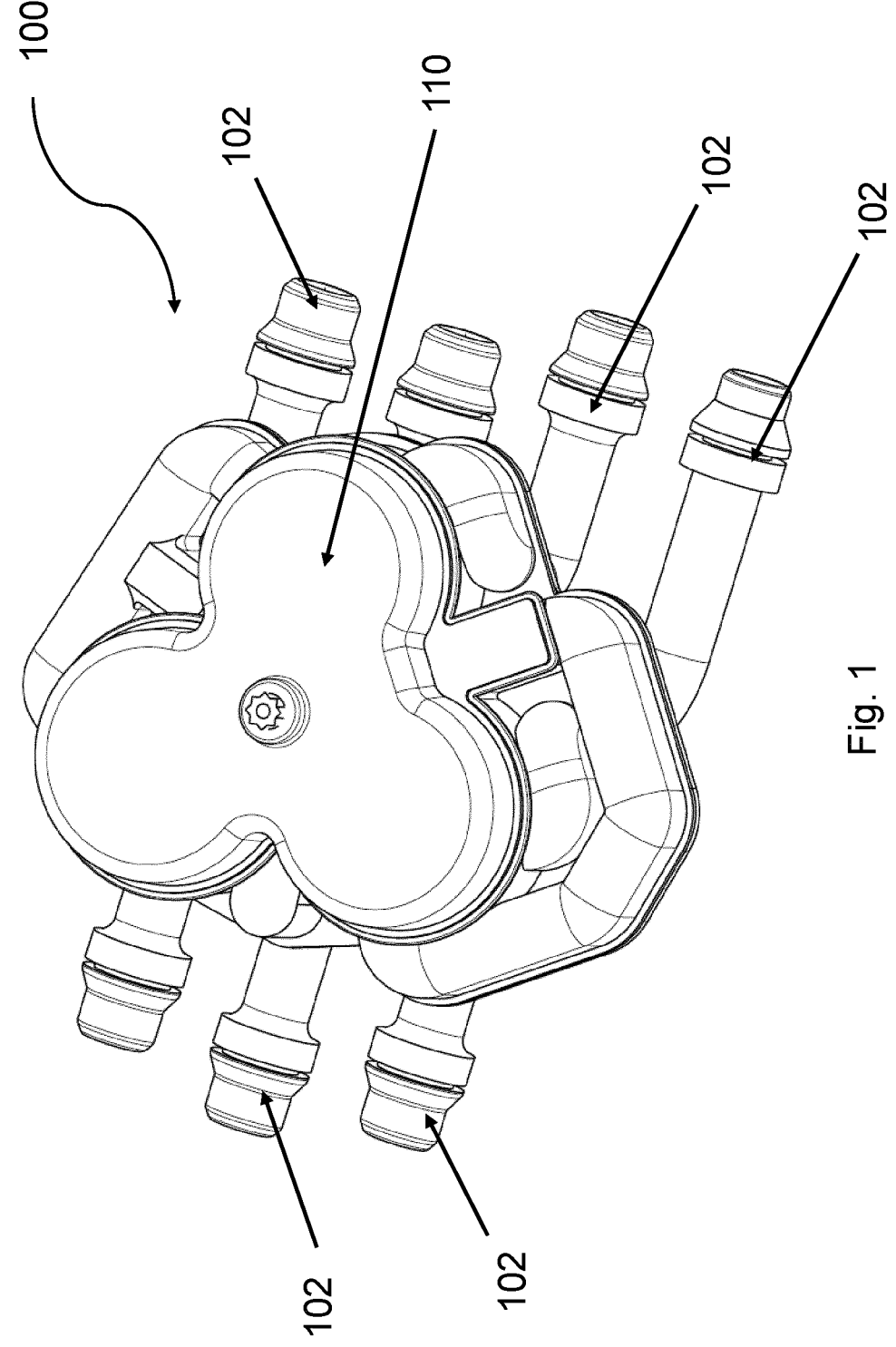
FIG. 1 a perspective illustration of a housing of a valve control device for a coolant circuit.

FIG. 1 shows a perspective illustration of a housing 110 of a valve control device 100 for a coolant circuit. The valve control device 100 comprises a plurality of fluid connections 102.

Figure 2:
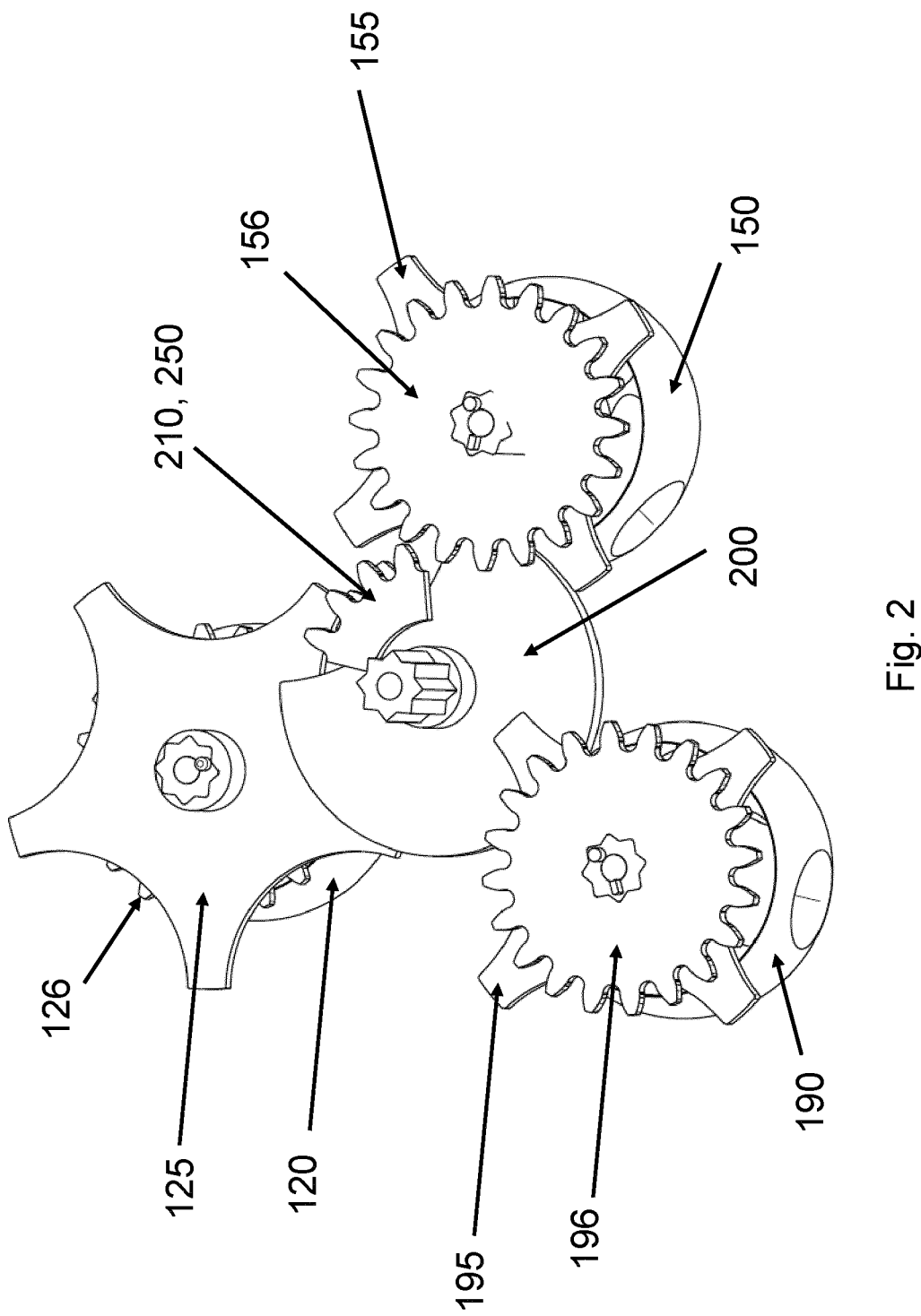
FIG. 2 a perspective illustration of an embodiment of a valve control device.

FIG. 2 shows a perspective illustration of an embodiment of a valve control device 100. The valve control device 100 comprises a first valve 120, a second valve 150 and a third valve 190. A functional element 125, 155, 195 is permanently associated with each of the valves 120, 150, 190. The first functional element 125 is associated with the first valve 120, wherein the first valve 120 is adapted to be variable in its switching position by rotation of the first functional element 125. The first valve 120 has a total of five switching positions. The second functional element 155 is associated with the second valve 150, wherein the second valve 150 is adapted to be variable in its switching position by rotation of the associated second functional element 155. The second valve 150 has a total of four switching positions. The third functional element 195 is associated with the third valve 190, wherein the third valve 190 is adapted to be variable in its switching position by rotation of the third functional element 195. Like the second valve, the third valve 190 has a total of four switching positions.

A locking mechanism 200 is located centrally between the valves 120, 150, 190. The locking mechanism 200 is adapted to transfer the valves 120, 150, 190 between their switching positions. The transfer takes place by means of engagement of a driving device 210 with the respective functional elements 125, 155, 195.

A spur gear 126, 156, 196 is associated with each functional element 125, 155, 195. The first functional element 125 comprises the first spur gear 126, the second functional element 155 comprises the second spur gear 156 and the third functional element 195 comprises the third spur gear 196. The driving device 210 of the locking mechanism 200 comprises a first spur gear cutout 250 which is adapted to engage either with the second spur gear 156 or with the third spur gear 196.

As a result, an optimal torque transmission can take place between the locking mechanism 200 and the respective valve 150, 190, wherein each corresponding spur gear 156, 196 interacts with the first spur gear cutout 250 of the driving device 210. The torque transmission takes place here by means of a continuous movement, because the angular speed between the locking mechanism 200 and the functional elements 155, 195 is constant. The locking mechanism 200 itself can be driven centrally with only one drive (not shown), as a result of which at least two valves 150, 190 can be switched with only one drive.

Figure 3:
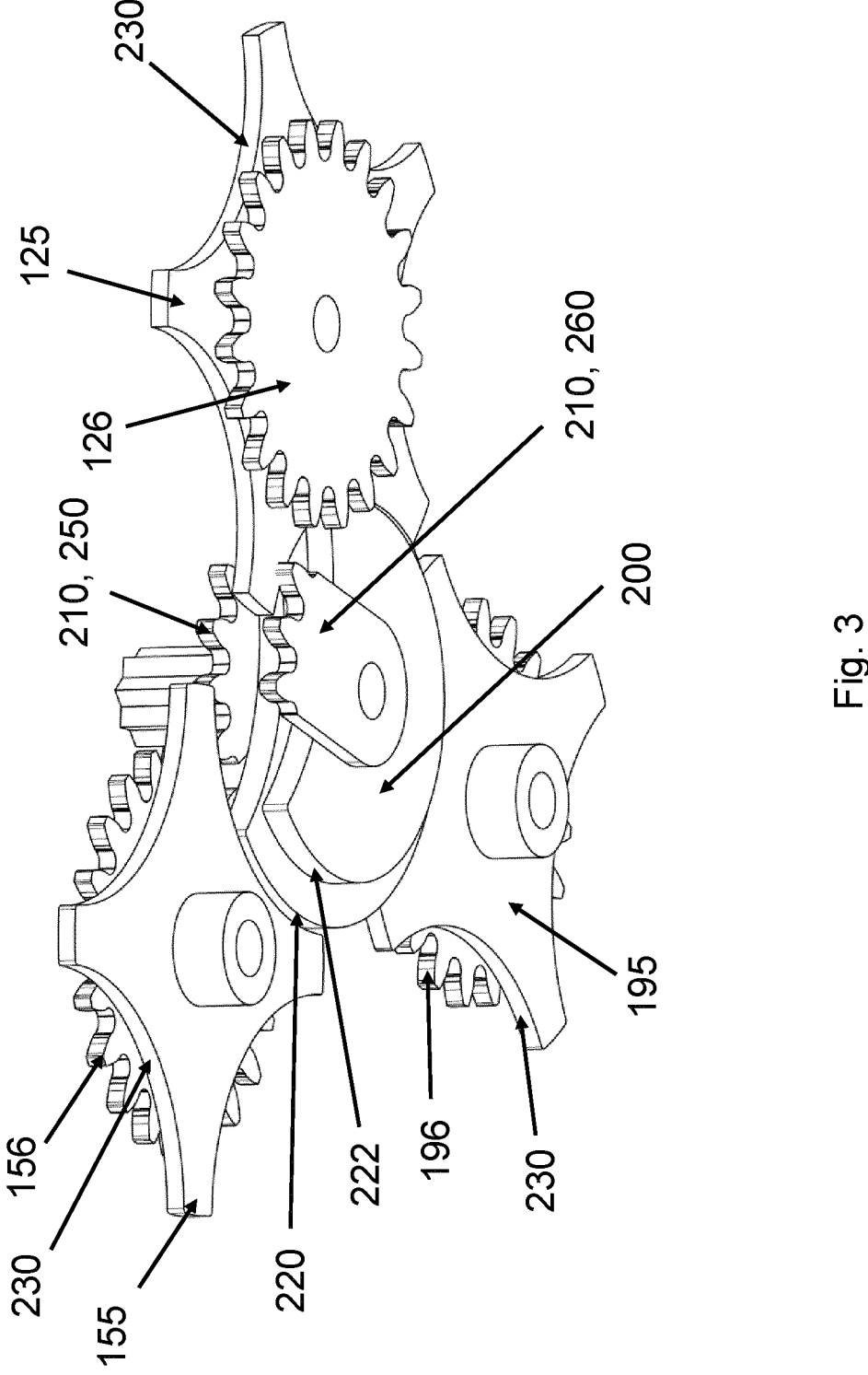
FIG. 3 a further illustration of an embodiment of a valve control device.

FIG. 3 shows a further illustration of an embodiment of a valve control device 100. The valve control device 100 comprises the locking mechanism 200 arranged centrally between the functional elements 125, 155, 195. The locking mechanism 200 is adapted to transfer the functional elements 125, 155, 195, which can be connected by means of valves, between their switching positions. For transferring the functional elements 125, 155, 195, the locking mechanism 200 comprises the driving device 210. The driving device 210 comprises the first spur gear cutout 250 which is adapted to engage either with the second spur gear 156 or with the third spur gear 196. In addition, the driving device 210 comprises a second spur gear cutout 260 to engage with the first spur gear 126 of the first functional element 125.

The second spur gear 156 and the third spur gear 196 are located above the second functional element 155 and the third functional element 195. In contrast to the second functional element 155 and the third functional element 195, the first functional element 125 comprises a first spur gear 126 which is arranged not above but below the functional element 125.

In addition, the locking mechanism 200 comprises a first locking contour 220 and a second locking contour 222. The locking contours 220, 222 are adapted to abut against locking surfaces 230 of the functional elements 125, 155, 195. The first locking contour 220 is adapted to abut against the locking surfaces 230 of the second functional element 155 and the third functional element 195. The second locking contour 222, on the other hand, is adapted to abut against the locking surfaces 230 of the first functional element 125.

The locking contours 220, 222 are formed as lateral surfaces of a cylinder and slide along a corresponding locking surface 230 of a functional element 125, 155, 195. As a result, the valve 120, 150, 190 associated with the corresponding functional element 125, 155, 195 cannot perform any rotation. Thus, for example, when the second spur gear cutout 260 engages with the first spur gear 126 and transfers the latter from a first switching position to a second switching position, the second functional element 155 and the third functional element 195 are fixed in their respective switching position by the first locking contour 220. Here, the first locking contour 220 of the locking mechanism 200 slides along the locking surface 230 of the second functional element 155 and the third functional element 195. On the other hand, when the first spur gear cutout 250 engages with the second spur gear 156 and transfers the latter from a first switching position to a second switching position, the first functional element 125 is fixed in its respective switching position by the second locking contour 222. Here, the second locking contour 222 of the locking mechanism 200 slides along the locking surface 230 of the first functional element 125.

Figure 4B:
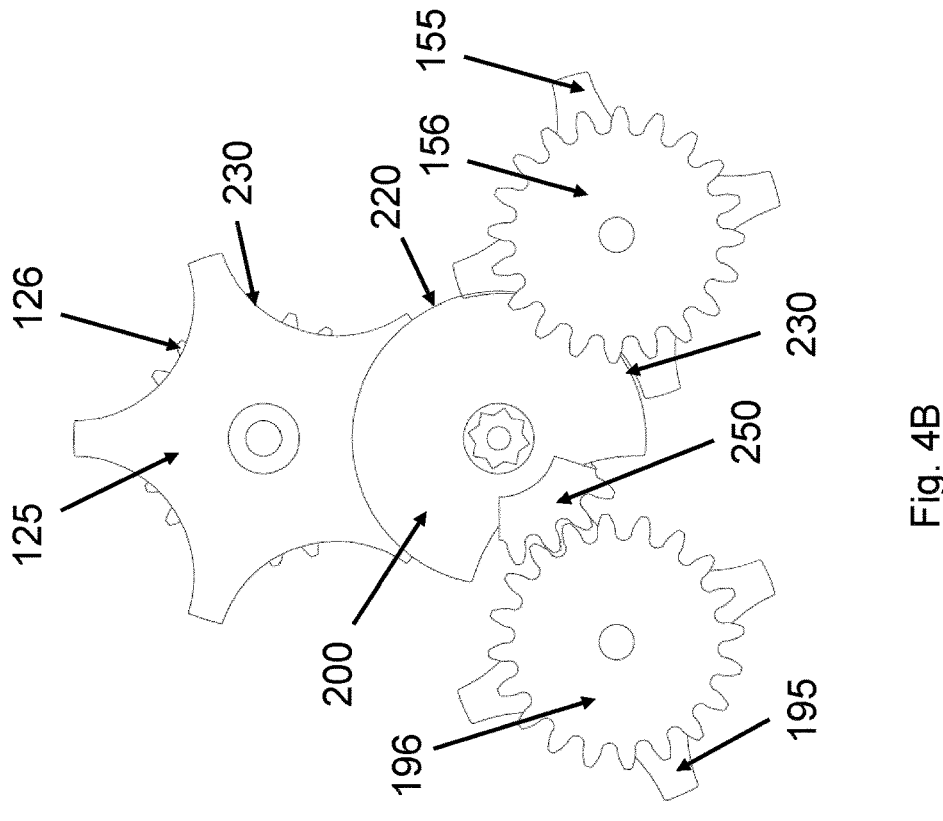
FIG. 4B a plan view of a valve control device in a further switching position.
Figure 4A:
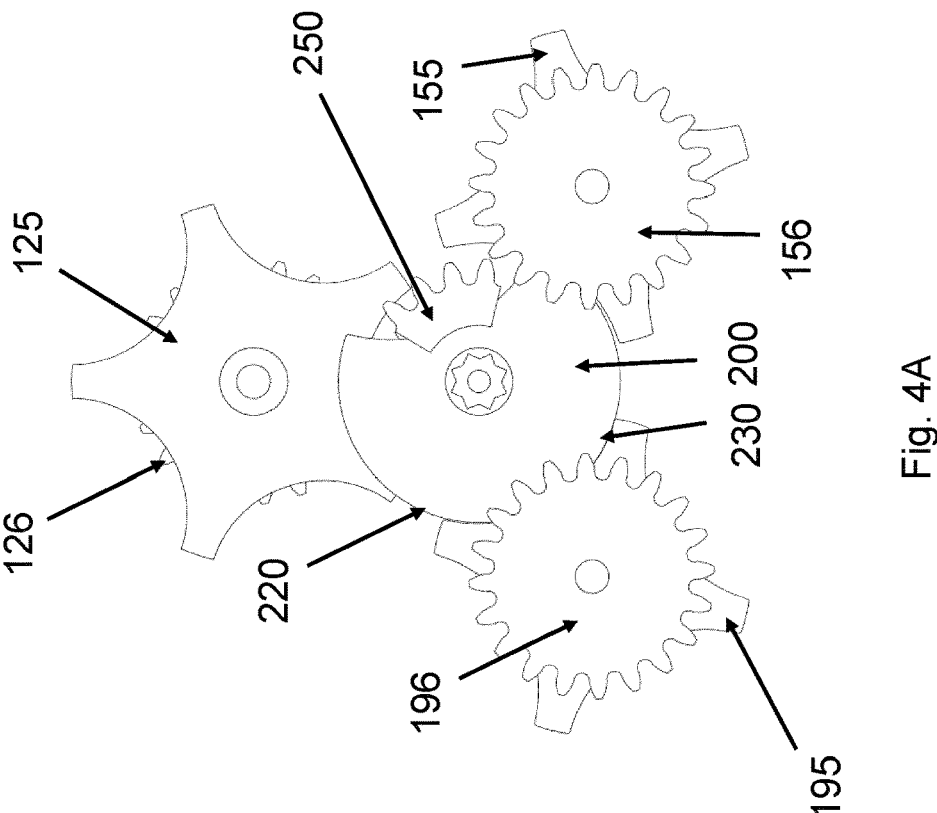
FIG. 4A a plan view of a valve control device in a switching position.

FIG. 4A shows a plan view of a valve control device 100 in a switching position. The valve control device 100 comprises the locking mechanism 200 arranged centrally between the functional elements 125, 155, 195, which is adapted to transfer the functional elements 125, 155, 195 between their switching positions. For transferring the functional elements 125, 155, 195, the locking mechanism 200 comprises the driving device 210 with the first spur gear cutout 250 which is adapted to engage either with the second spur gear 156 or with the third spur gear 196.

FIG. 4A shows the first spur gear cutout 250 in a position between the first functional element 125 and the second functional element 155.

The first valve 120 (not shown) associated with the first functional element 125 comprises a total of five switching positions. The second valve 150 (not shown) associated with the second functional element 155 and the third valve 190 (not shown) associated with the third functional element 195 each comprise four switching positions.

During a clockwise rotation of the locking mechanism 200, the first spur gear cutout 250 engages with the second spur gear 156 and transfers the second valve 150 (not shown) associated with the second functional element 155 by one switching position. During this transfer, the first locking contour 220 of the locking mechanism 200 slides along the locking surface 230 of the third functional element 195, as a result of which the third functional element 195 and thus the third valve 190 (not shown) associated with the third functional element 195 is fixed in its switching position.

FIG. 4B shows a plan view of a valve control device 100 in a further switching position. FIG. 4B shows the first spur gear cutout 250 in a position in which the first spur cutout 250 engages with the third spur gear 196 in order to transfer the third functional element 195 from a first switching position to a second switching position. During this transfer, the first locking contour 220 of the locking mechanism 200 slides along the locking surface 230 of the second functional element 155, as a result of which the second functional element 155 and thus the second valve 150 (not shown) associated with the second functional element 155 is fixed in its switching position. At the same time, the second locking contour 222 (not shown) of the locking mechanism 200 slides along the locking surface 230 of the first functional element 125, as a result of which the first functional element 125 and thus the first valve 120 (not shown) associated with the first functional element 125 is fixed in its switching position.

The invention claimed is:

1. A valve control device for a coolant circuit of a motor vehicle, comprising:
   a first valve with an associated first functional element,
   a second valve with an associated second functional element,
   wherein the first valve and the second valve are configured to be variable in respective switching positions thereof by rotation of the respectively associated first and second functional elements,
   a locking mechanism comprising a driving device, wherein the locking mechanism is configured to be rotatable by a drive, and
   wherein the locking mechanism is configured to transfer the first valve from a first switching position to a second switching position of the first valve by engagement of the driving device with the first functional element and to transfer the second valve from a first switching position to a second switching position of the second valve by engagement of the driving device with the second functional element,
   wherein the driving device comprises a first spur gear cutout to engage with the first functional element or with the second functional element,
   wherein the driving device further comprises a second spur gear cutout to engage with the first functional element or with the second functional element, and
   wherein the first spur gear cutout and the second spur gear cutout are arranged spaced apart from each other in an axial direction of the locking mechanism.

2. The valve control device according to claim 1, wherein the first functional element and the second functional element each comprise a spur gear for engagement of the first spur gear cutout or the second spur gear cutout.

3. The valve control device according to claim 1, wherein the locking mechanism further comprises a first locking contour for abutment against a locking surface of the first functional element and/or against a locking surface of the second functional element.

4. The valve control device according to claim 3, wherein the locking mechanism further comprises a second locking contour for abutment against the locking surface of the first functional element and/or against the locking surface of the second functional element.

5. The valve control device according to claim 4, wherein the first locking contour and the second locking contour are arranged spaced apart from each other in an axial direction of the locking mechanism.

6. The valve control device according to claim 1, further comprising a third valve with an associated third functional element, wherein the third valve is configured to be variable in a switching position thereof by rotation of the third functional element, and wherein the locking mechanism is configured to transfer the third valve from a first switching position to a second switching position of the third valve by engagement of the driving device with the third functional element.

7. The valve control device according to claim 6, wherein the first spur gear cutout is configured to engage with the second functional element and with the third functional element.

8. The valve control device according to claim 6, wherein the locking mechanism further comprises a first locking contour, and wherein the first locking contour is configured to abut against a locking surface of the second functional element and against a locking surface of the third functional element.

9. The valve control device according to claim 4, wherein the second spur gear cutout is configured to engage with the first functional element, and the second locking contour is configured to abut against the locking surface of the first functional element.

10. The valve control device according to claim 1, wherein the first functional element comprises an odd number of switching positions and the second functional element comprises an even number of switching positions.

11. The valve control device according to claim 10, further comprising a third valve with an associated third functional element, wherein the third valve is configured to be variable in a switching position thereof by rotation of the third functional element, wherein the locking mechanism is configured to transfer the third valve from a first switching position to a second switching position of the third valve by engagement of the driving device with the third functional element, and wherein the third functional element comprises an even number of switching positions.

12. The valve control device according to claim 6, wherein the first valve, the second valve and the third valve each comprise at least one rotary slide valve.

13. A valve control device for a coolant circuit of a motor vehicle, comprising:

a first valve with an associated first functional element, a second valve with an associated second functional element, wherein the first valve and the second valve are configured to be variable in respective switching positions thereof by rotation of the respectively associated first and second functional elements, a locking mechanism comprising a driving device, wherein the locking mechanism is configured to be rotatable by a drive, and wherein the locking mechanism is configured to transfer the first valve from a first switching position to a second switching position of the first valve by engagement of the driving device with the first functional element and to transfer the second valve from a first switching position to a second switching position of the second valve by engagement of the driving device with the second functional element, wherein the locking mechanism further comprises a first locking contour for abutment against a locking surface of the first functional element and/or against a locking surface of the second functional element, wherein the locking mechanism further comprises a second locking contour for abutment against the locking surface of the first functional element and/or against the locking surface of the second functional element, and wherein the first locking contour and the second locking contour are arranged spaced apart from each other in an axial direction of the locking mechanism.

* * * * *